United States Patent
Berns

(10) Patent No.: US 6,202,523 B1
(45) Date of Patent: Mar. 20, 2001

(54) AIR OPERATED LOADING AND UNLOADING DEVICE

(75) Inventor: Joseph P. Berns, Cincinnati, OH (US)

(73) Assignee: J. F. Berns Co., Inc., Cincinnati, OH (US)

( * ) Notice: Subject to any disclaimer, the term of this patent is extended or adjusted under 35 U.S.C. 154(b) by 0 days.

(21) Appl. No.: 09/188,947

(22) Filed: Nov. 10, 1998

(51) Int. Cl.[7] ............................................ B23B 13/10
(52) U.S. Cl. ............................ 82/124; 82/125; 82/126; 82/127; 414/17
(58) Field of Search ........................... 82/127, 126, 125, 82/124, 1.11; 414/14, 17, 18, 736

(56) References Cited

U.S. PATENT DOCUMENTS

| | | |
|---|---|---|
| 3,823,628 | 7/1974 | Fortune . |
| 3,937,331 * | 2/1976 | Spercel ........................... 82/126 X |
| 3,945,275 | 3/1976 | Ovanin . |
| 4,254,676 | 3/1981 | Wilson . |
| 4,536,000 | 8/1985 | Röhm ................................. 279/1 |
| 4,624,611 * | 11/1986 | Fabbri ............................ 82/127 X |
| 4,645,220 | 2/1987 | Hiestand ........................... 279/111 |
| 4,700,593 * | 10/1987 | Cucchi ............................... 82/127 |
| 4,909,521 | 3/1990 | Ovanin ................................. 279/1 |
| 4,932,674 | 6/1990 | Pesch et al. ........................... 279/4 |
| 4,996,897 * | 3/1991 | Cucchi ............................ 82/127 X |
| 5,333,524 * | 8/1994 | Goforth ............................... 82/127 |
| 5,505,584 | 4/1996 | Berns ............................. 414/745.1 |
| 5,541,588 | 7/1996 | Matsuhashi et al. ........... 340/870.01 |
| 5,676,031 | 10/1997 | Manning ............................... 82/153 |
| 5,715,735 | 2/1998 | Alden et al. .......................... 82/124 |
| 5,777,562 | 7/1998 | Hoffman ....................... 340/870.07 |
| 5,946,993 * | 9/1999 | Flanagan ......................... 82/125 X |

* cited by examiner

Primary Examiner—Henry W. H. Tsai
(74) Attorney, Agent, or Firm—Wood, Herron & Evans, L.L.P.

(57) ABSTRACT

A device for effecting at least one of a loading and unloading operation of a workpiece with respect to a machine tool. The device includes a base adapted to be mounted adjacent the machine tool and a tubular member. The tubular member includes an inner chamber and an elongate opening communicating with the inner chamber for receiving the workpiece. The inner chamber has one end adapted to communicate with a spindle of the machine tool and the tubular member is mounted for rotation with respect to the base. A sealing member is mounted for selective removal and sealing engagement with respect to the elongate opening and a source of pressurized air communicates with the chamber for moving the workpiece in at least one direction within the chamber when the sealing member is in sealing engagement around the elongate opening. A sensing device detects the presence of a workpiece in the machine tool spindle and generally includes support structure and first and second detection members operatively associated with a motion detection device. A wireless transmitter is mounted to the support structure and is electrically connected to the motion detection device for transmitting a signal indicating a proper position of the workpiece.

14 Claims, 9 Drawing Sheets

AIR OPERATED LOADING AND UNLOADING DEVICE

FIELD OF THE INVENTION

The present invention generally relates to loading and unloading apparatus for machine tools and the like. More specifically, the invention relates to air operated loading and/or unloading devices and controls related to machine tools.

BACKGROUND OF THE INVENTION

Various types of feed mechanisms exist in the machine tool industry to automate the loading and/or unloading of workpieces into and out of a machine tool. In this regard, it is desirable with respect to both production speed and safety to automatically place workpieces into the machine tool prior to a machine operation and then to automatically remove the workpieces from the machine tool when the machining operation or operations are complete. The intervention of machine tool operators during the process slows the production time and presents additional dangers to the operator.

Many automated loading and unloading devices are too complex and expensive to justify their use in any but the most elaborate and expensive machine tools. Such loading and unloading mechanisms may include, for example, robotic devices or other programmable or otherwise electrically controlled arms, indexing devices, etc. While needs exist in the industry for these sophisticated and expensive machine tool loading and unloading mechanisms, especially in connection with many high volume machining operations, these solutions to the problems associated with manual loading and unloading operations can be too expensive.

One air operated loading and unloading device that solves many of the problems typical of manual loading and unloading operations is disclosed in U.S. Pat. No. 5,505,584 (the '584 patent), assigned to the assignee of the present invention and the disclosure of which is hereby incorporated herein by reference. Using this device, a workpiece may be unloaded and/or loaded via a concentric tubular arrangement. The tubes rotate with respect to each other to facilitate either an unloading operation or a loading and unloading operation with respect to a machine tool spindle. Although the apparatus disclosed in the '584 patent performs well, drawbacks have been experienced with respect to the need to closely fit the inner and outer concentric tubes for adequate, repeatable sealing. For these reasons, improvements related to the ability to adequately and repetitively seal the inner chamber of the concentric tube arrangement are in continuing need.

Another problem related to the machine tool industry is related to detecting when a workpiece is fully received within the machine tool spindle after actuation of a loading device, such as the device disclosed in the '584 patent. When a mechanical device, as opposed to an air operated device, is used to feed a workpiece into a machine tool, a switch or other detection system can indicate full movement of the mechanical feeder and the attached workpiece into the machine tool. When air is used, however, it becomes more difficult to integrate a detection system. In this regard, it is generally impractical to connect hardwired detectors to a rotating machine tool turret to indicate the presence of a workpiece in the spindle of the machine tool. In such a case, the wires will interfere with rotation of the turret. Also, mounting in other locations of the machine tool proximate the spindle may not be possible.

Improvements related to the machine tool industry, and more specifically related to air operated loading and unloading devices therefore continue to be necessary.

SUMMARY OF THE INVENTION

Generally, the present invention provides a device for effecting at least one of a loading and unloading operation of a workpiece with respect to a machine tool. The device includes a base adapted to be mounted adjacent the machine tool and a tubular member mounted for rotation with respect to the base. The tubular member includes an inner chamber and an elongate opening communicating with the inner chamber for receiving the workpiece. The inner chamber includes one end adapted to communicate with a spindle of the machine tool. In accordance with the invention, a sealing member is mounted for selective removal from the tubular member and for selective, sealing engagement around the elongate opening. As the sealing member is not a concentric, cylindrical member, sizing of the sealing member with respect to the tubular member is not as critical as in the above-mentioned '584 patent. Instead, this sealing member may be simply an arc-shaped member which is either manually engaged and removed from the tubular member or automatically engaged and removed using an actuator. A source of pressurized air communicates with the chamber of the tubular member for moving the workpiece in at least one direction, i.e., a loading or unloading direction, within the chamber when the sealing member is in sealing engagement around the elongate opening.

In the case in which the device is used for both loading and unloading a workpiece, a rotary actuator is preferably used to automatically open and close the elongate opening. When open, a workpiece may be dropped into the elongate opening and then the rotary actuator may be activated to seal the elongate opening. Upon sealing the opening, the chamber is pressurized to send the workpiece into the machine tool spindle. The chamber is pressurized in a reverse direction to retrieve the workpiece into the chamber using vacuum. Upon retrieval of the workpiece, the tubular member is rotated to expose the elongate opening and unload the workpiece. When the device is used only as an unloading device, the sealing member may be mechanically fastened about the elongate opening in a removable fashion and in a manner that still allows rotation of the tubular member. In these cases, the machine tool spindle is typically loaded in another manner, such as by a mechanical feeding device on the opposite end of the spindle and the unloading device retrieves the workpiece through the other end of the spindle upon completion of the machining operation.

The invention further contemplates a sensing device for detecting the presence of a part, such as a workpiece in a machine tool spindle. While the sensing device will have many uses in the part detection field, it is also particularly useful in conjunction with the air operated loading device of the invention. Generally, the device includes a sensor support structure, a first detection member mounted for reciprocating movement relative to the support structure, a motion detection device, a wireless transmitter and at least one battery for powering the motion detection device and the wireless transmitter. The motion detection device is connected to the first detection member and detects motion thereof to generate a first signal in response to movement of the first detector member by the workpiece or other type of part. The wireless transmitter is mounted to the support structure and is electrically connected to the motion detection device. The wireless transmitter transmits a second signal in response to the first signal. The battery is likewise mounted to the support structure and powers the motion detection device and the wireless transmitter. The wireless transmitter may be, for example, a radio frequency (RF) or infrared (IR) transmitter.

A self-contained sensing device is therefore provided which, for example, may be connected directly to a station on a rotating turret without requiring any hardwiring. This station may be a home station in line with the machine tool spindle such that, when the air operated loading device of this invention sends a workpiece into the machine tool spindle, the workpiece contacts and moves the first detection member. Ultimately, this causes the wireless transmitter to send a signal to an appropriate wireless receiver that may be connected with the control system of the loading device and/or the machine tool. This signal can indicate that the machining operation may commence.

In the preferred embodiment, the sensing device further includes a second detection member mounted for reciprocating movement relative to the first detection member. The second detection member can move between a first position and a second position under the force of the workpiece being fed into the machine tool spindle. The second detection member is biased to return to the first position to indicate a proper work position of the workpiece or other part. A movable member is preferably mounted within the second detection member and is operatively connected between the first detection member and the motion detection device. The movable member moves in response to movement of the first detection member and thereby indicates the presence of the workpiece or other part to the motion detection device. To facilitate motion of the movable member, the first detection member can include a cam surface. The motion detection device may comprise various types of devices, but in one form is a limit switch having a switch element operable by the movable member. A shock absorbing mechanism, which may comprise a spring and hydraulic shock absorber, is connected to the second detection member and absorbs the force of the workpiece or part impacting against the second detection member. This shock absorbing mechanism also returns the second detection member to the first position to indicate proper workpiece or part placement as noted above and to activate the limit switch in a sustained manner. This sustained signal from the limit switch is relayed to the appropriate machine control by the wireless transmitter.

Various additional objectives, advantages, and features of the invention will become more readily apparent to those of ordinary skill in the art upon review of the following detailed description of the preferred embodiments taken in conjunction with the accompanying drawings.

DETAILED DESCRIPTION OF THE PREFERRED EMBODIMENTS

Figure 1:
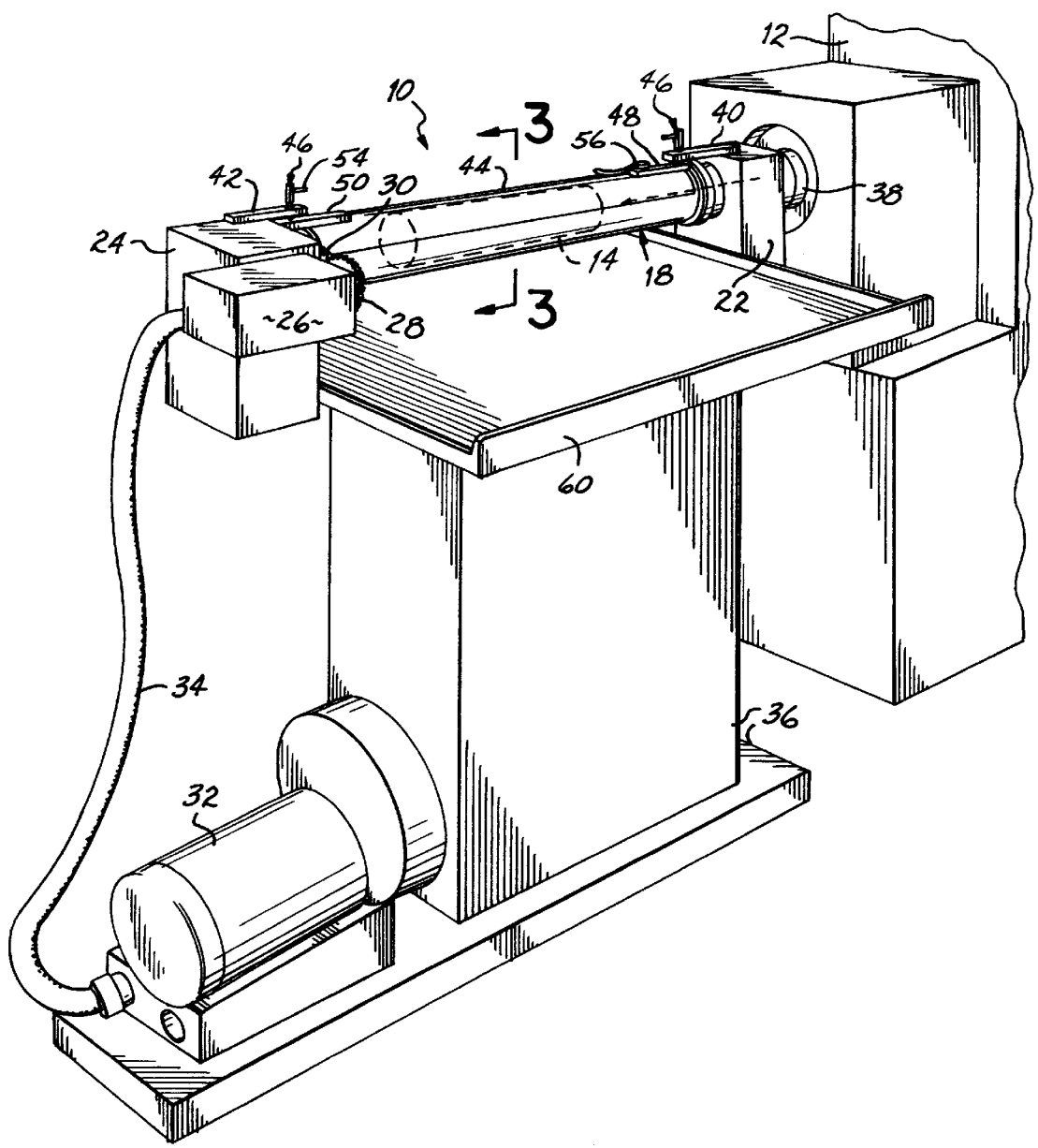
FIG. 1 is a perspective view of an air operated unloading device connected to a lathe and constructed in accordance with a preferred embodiment of the invention.
Figure 2:
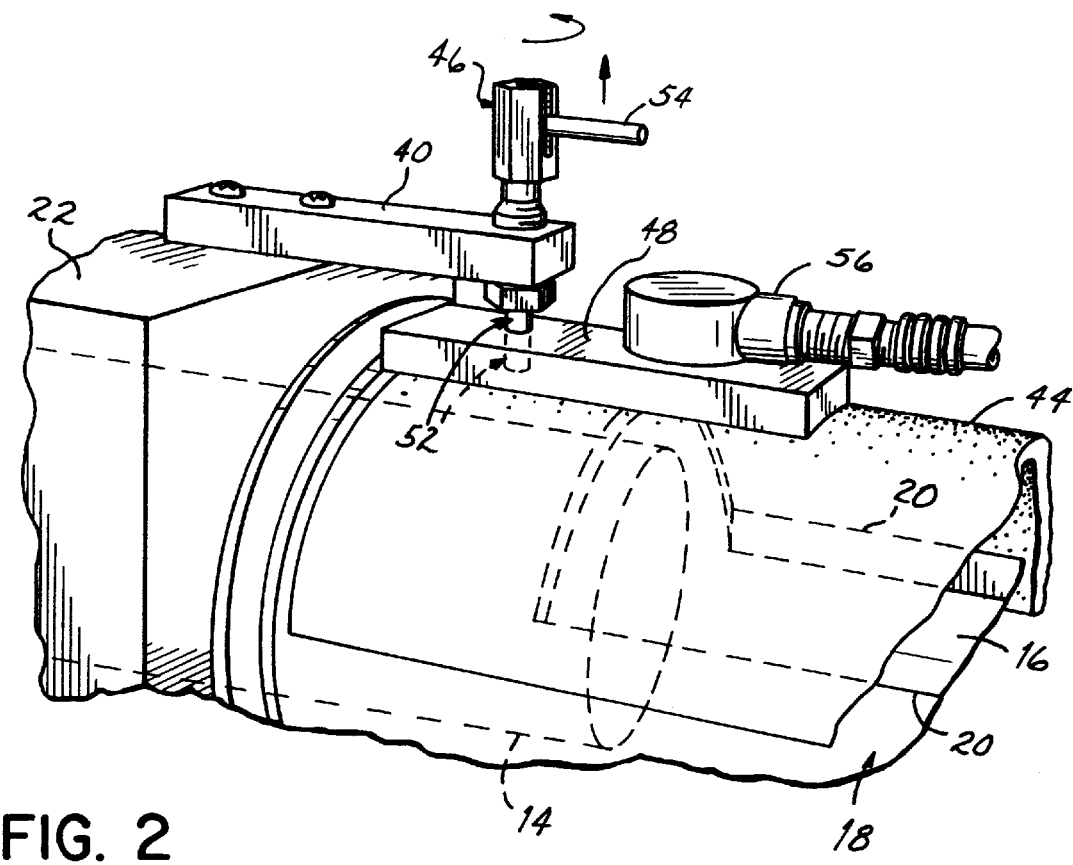
FIG. 2 is an enlarged perspective view showing the preferred mechanical connection for engaging the sealing member to the rotatable tubular member of the device.

Referring first to FIGS. 1 and 2, an unloading device 10 constructed in accordance with a first embodiment of the invention is shown disposed adjacent a lathe 12. Device 10 is used only as an unloading device and operates to retrieve workpieces 14 from lathe 12 into a chamber 16 associated with a tubular member 18. Tubular member 18 includes an elongate slot or opening 20 and is mounted for rotation between a pair of supports 22, 24. Tubular member 18 may be selectively rotated by an appropriate control using a rotary actuator 26 having a toothed drive wheel 28 engaged with a toothed circumferential portion 30 of tubular member 18. A source of pressurized air, such as an air pump 32, connects via a hose 34 to the interior of support 24. This hose may supply negative air pressure to tubular member 18 as generally discussed in the above incorporated '584 patent. The various components of device 10 are preferably mounted to a base 36 such that chamber 16 is disposed in line with a spindle liner 38 of lathe 12.

A pair of fixtures 40, 42 are used to mount a sealing member 44 in selectively engaged and sealing relation about elongate opening 20. In the preferred embodiment, tubular member 18 is a cylindrical tube and sealing member 44 is of complimentary arc shape. Sealing member 44 may be formed of a suitable phenolic material. A pair of fasteners 46 may be selectively engaged and disengaged between fixtures 40, 42 and a pair of mounting members 48, 50 rigidly affixed to sealing member 44. More specifically, as shown in FIG. 2, fasteners 46 include a pin 52 which may be moved downward into mounting member 48 in the engaged position shown. When it is necessary to remove sealing member 44, an end 54 of pin 52 may be lifted and rotated to disengage pin 52 from mounting member 48. This may be done at the opposite end of sealing member 44 as well to allow selective removal of sealing member 44. As also shown in FIG. 2, a sensor 56 may be provided for detecting when workpiece 14 has been unloaded from lathe 12.

Figure 3A:
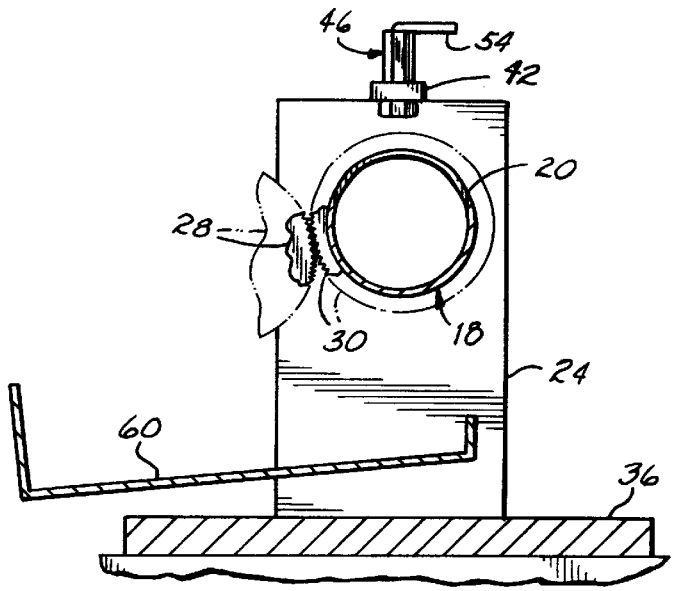
FIG. 3A is a cross sectional view taken along line 3—3 of FIG. 1 schematically illustrating the device with the sealing member removed.
Figure 3B:
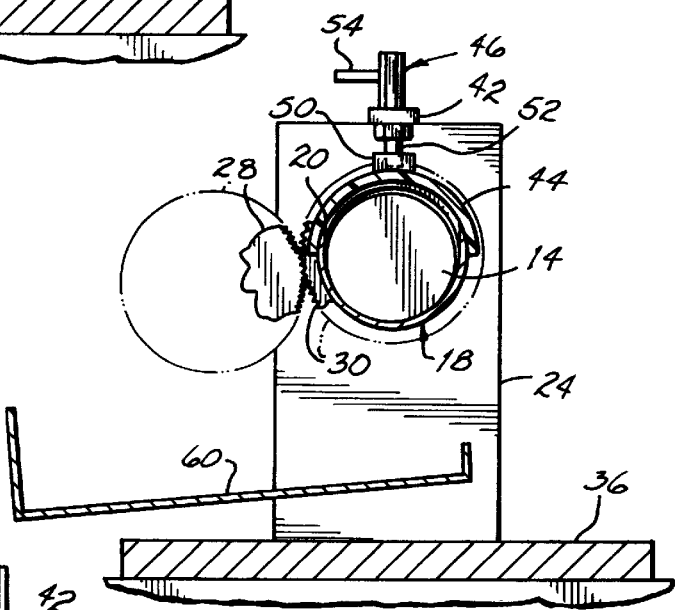
FIG. 3B is a cross sectional view similar to FIG. 3A, but showing the sealing member fastened to the tubular member with a workpiece received therein.
Figure 3C:
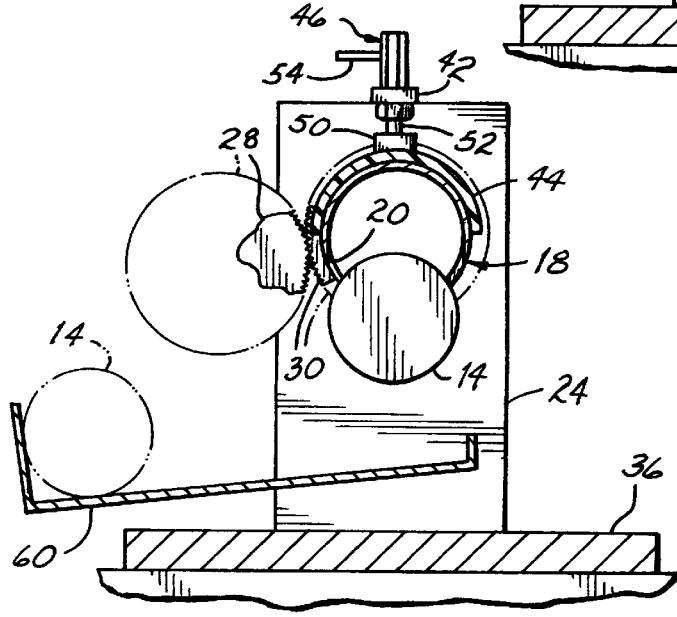
FIG. 3C is a cross sectional view similar to FIGS. 3A and 3B, but showing the tubular member rotated with respect to the sealing member and releasing the workpiece.

Now referring to FIG. 3A, tubular member 18 is shown with sealing member 44 removed. To unload a workpiece 14 from lathe 12 (FIG. 1), sealing member 44 is fastened in place as shown in FIG. 3B. As further shown in FIG. 3B, with sealing engagement being formed between sealing member 44 and tubular member 18, i.e., by closing elongate opening 20, workpiece 14 may be drawn from lathe 12 into chamber 16 by pump 32. Once drawn into chamber 16, actuator 26 may be activated to rotate wheel 28 and wheel 30. This rotates tubular member 18 with respect to sealing member 44 to expose elongate opening 20 in a downward orientation. Thus, workpiece 14 drops into tray 60 as shown in FIG. 3C. Rotary actuator 26 then rotates tubular member 18 to again seal elongate opening 20 as shown in FIG. 3B after which the next workpiece may be withdrawn under vacuum.

Figure 4:
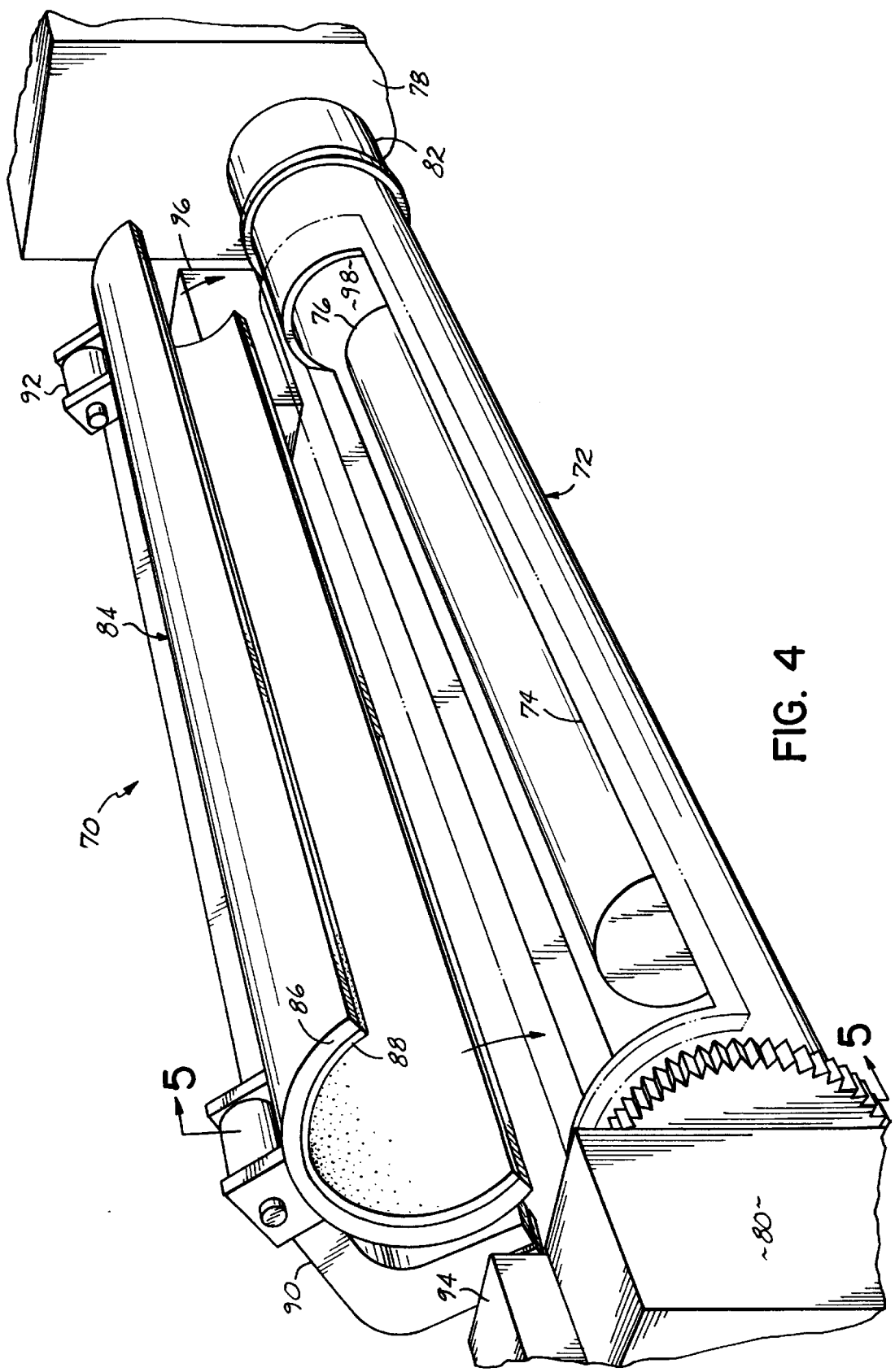
FIG. 4 is a perspective view of an alternative embodiment of the invention in the form of an automated loading and unloading device.

Turning now to FIG. 4, an air operated loading and unloading device 70 in accordance with a second embodiment of the invention comprises a tubular member 72 having an elongate slot or opening 74 for receiving workpieces 76. Tubular member 72 is mounted for rotation between respective supports 78, 80. Support 80 may further communicate with a lathe spindle liner 82 as discussed with respect to the first embodiment. A curved, elongate sealing member 84 is provided and comprises a curved metal support piece 86 and a phenolic liner 88 mounted for engagement and disengagement with respect to tubular member 72. A pair of support arms 90, 92 are connected to sealing member 84 and further connected to respective rotary actuators 94, 96. Device 70 operates in a similar manner to device 10, except that both positive and negative air pressure may be used to respectively load and unload workpieces 76 through tubular member 72. It will be understood that a reversible pump may be used to provide positive and negative pressure or a pump connected with appropriate valving can accomplish the same objective. Also, the loading operation may be automated as discussed below.

Figure 5A:
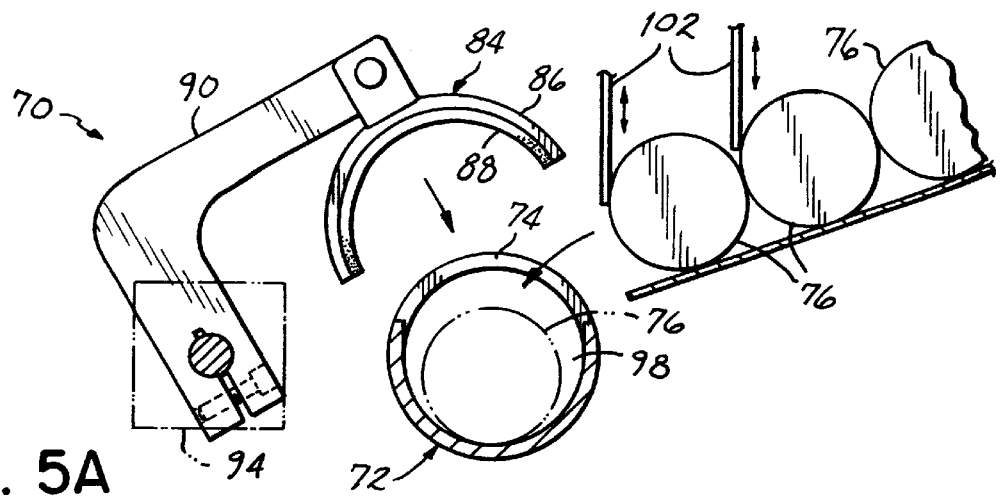
FIG. 5A is a cross sectional view taken along line 5—5 of FIG. 4 schematically illustrating the sealing member disengaged from the tubular member.
Figure 5B:
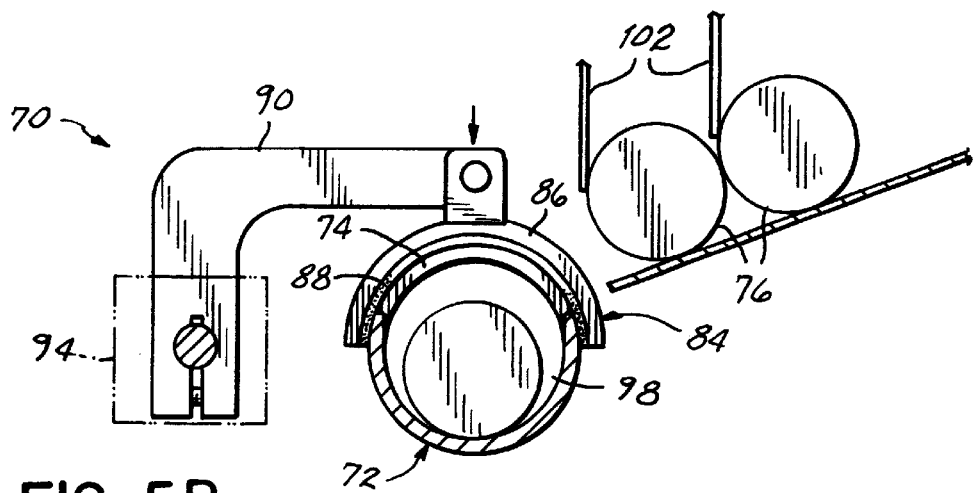
FIG. 5B is a cross sectional view similar to FIG. 5A, but showing the sealing member engaged with the tubular member and a workpiece received therein.
Figure 5C:
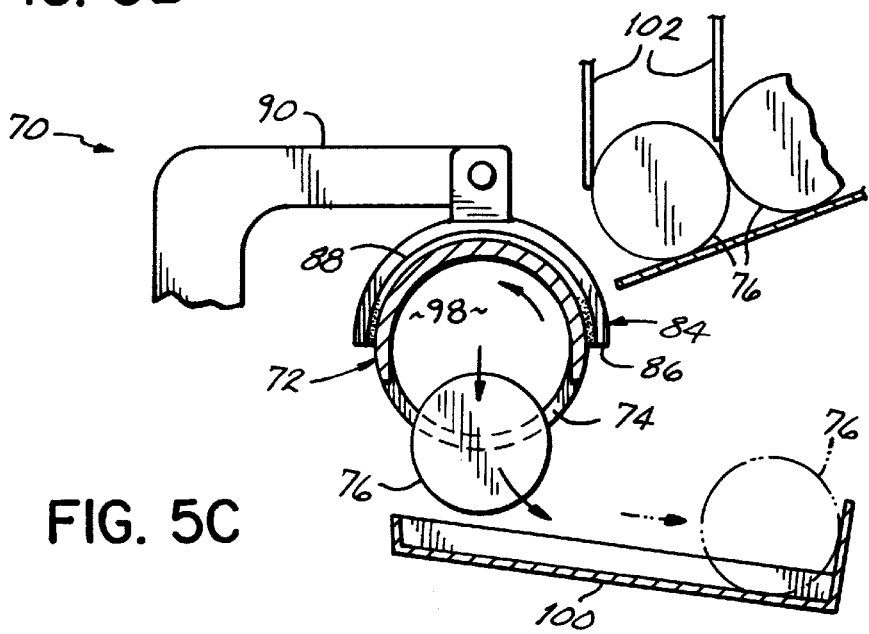
FIG. 5C is a cross sectional view similar to FIGS. 5A and 5B, but showing the tubular member rotated to release the workpiece.

Referring to FIGS. 5A–5C, workpieces 76 are initially loaded one at a time through elongate opening 74 of tubular member 72 when sealing member 84 is disengaged as shown in FIG. 5A. Once loaded with a workpiece 76, rotary actuators 94, 96 rotate sealing member 84 into sealing engagement around elongate opening 74 as shown in FIG. 5B. As described in the '584 patent, a mechanical arm or other type of piston arrangement (not shown) is used to initially move workpiece into spindle liner 82. The interior, sealed chamber 98 of tubular member 72 may then be positively pressurized to force the workpiece 76 into a machine tool, such as a lathe as shown in FIG. 1. Upon completion of the machining operation, chamber 98 is negatively pressurized or placed under vacuum. This draws workpiece 76 back into chamber 98. At this point, as shown in FIG. 5C, tubular member 72 may be rotated to expose elongate opening 74 and allow workpiece 76 to drop into a tray 100. Sealing member 84 may then be disengaged and tubular member 72 rotated to the position shown in FIG. 5A for receipt of the next workpiece 76. An appropriate feed mechanism or index arrangement, schematically illustrated by numeral 102, may be used to feed individual workpieces 76 through elongate opening 74.

Figure 6:
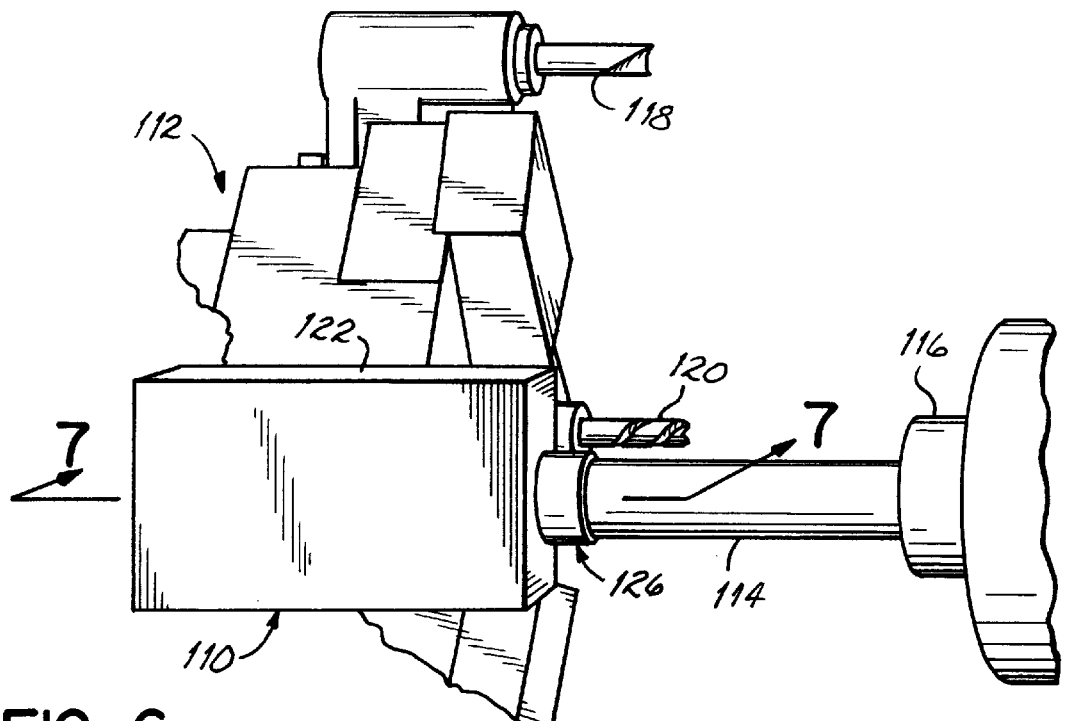
FIG. 6 is a perspective view showing a workpiece sensing device constructed in accordance with the invention affixed to a lathe turret.

FIG. 6 illustrates a workpiece sensing device 110 attached to the home station of a partially illustrated lathe turret 112. It will be understood that sensing devices constructed according to the teachings of the invention may have many other uses as well and that this is only one illustrative example. A workpiece 114 is shown extending through the lathe spindle 116, for example, after having been loaded into the lathe by device 70 of this invention. Lathe turret 112, as is typical, includes multiple stations with most of the stations including respective tools 118, 120 for performing machining operations on workpiece 114 as it is rotated by spindle 116. Workpiece sensing device 110 may be fixed at the home position or station of turret 112 by the same manner as tools 118, 120. Turret 112 is indexed or rotated to this position after machining of a workpiece 114 is complete.

Figure 7A:
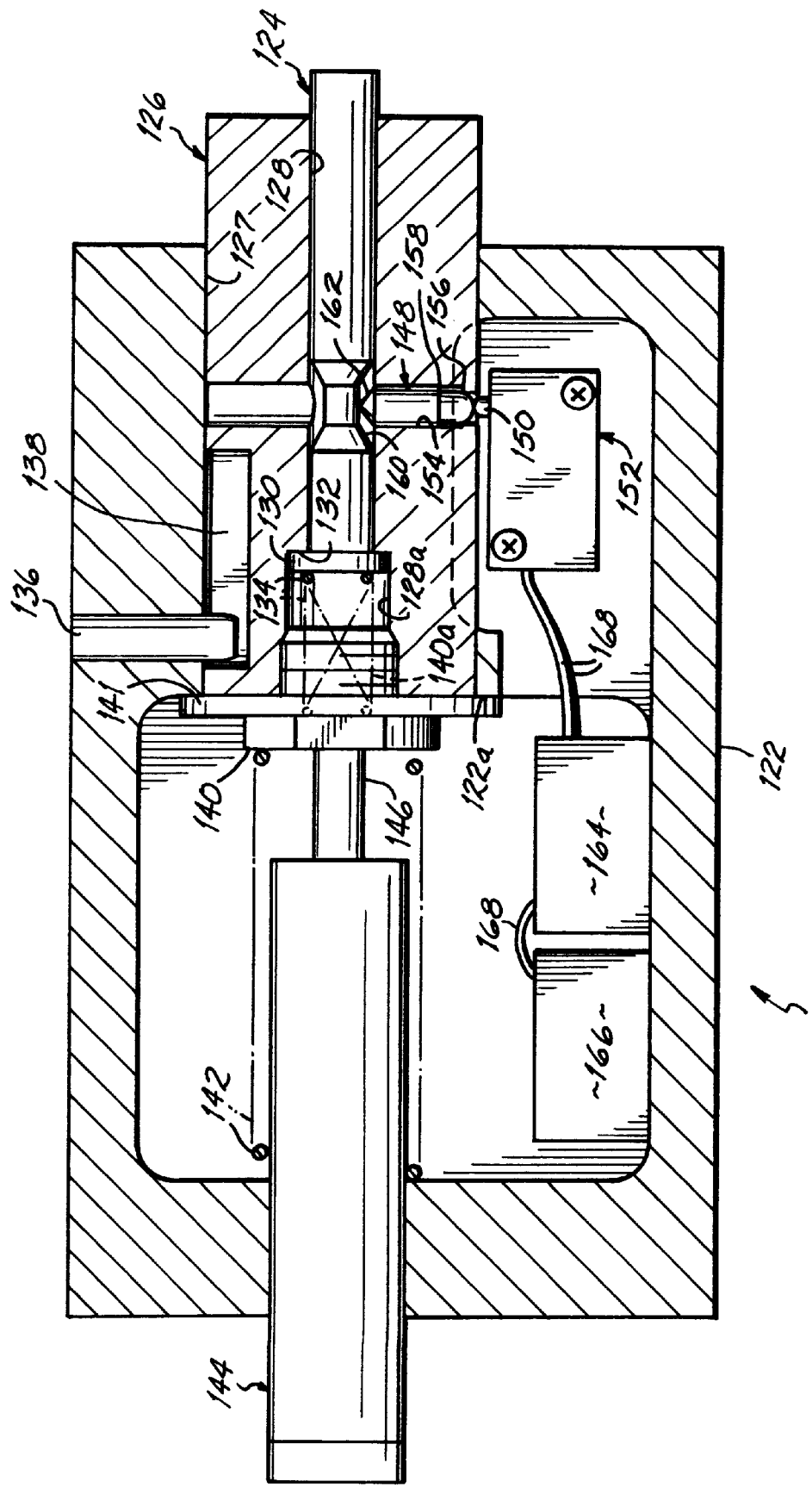
FIG. 7A is a cross sectional view taken generally along line 7—7 of FIG. 6 and disengaged from the workpiece.
Figure 7B:
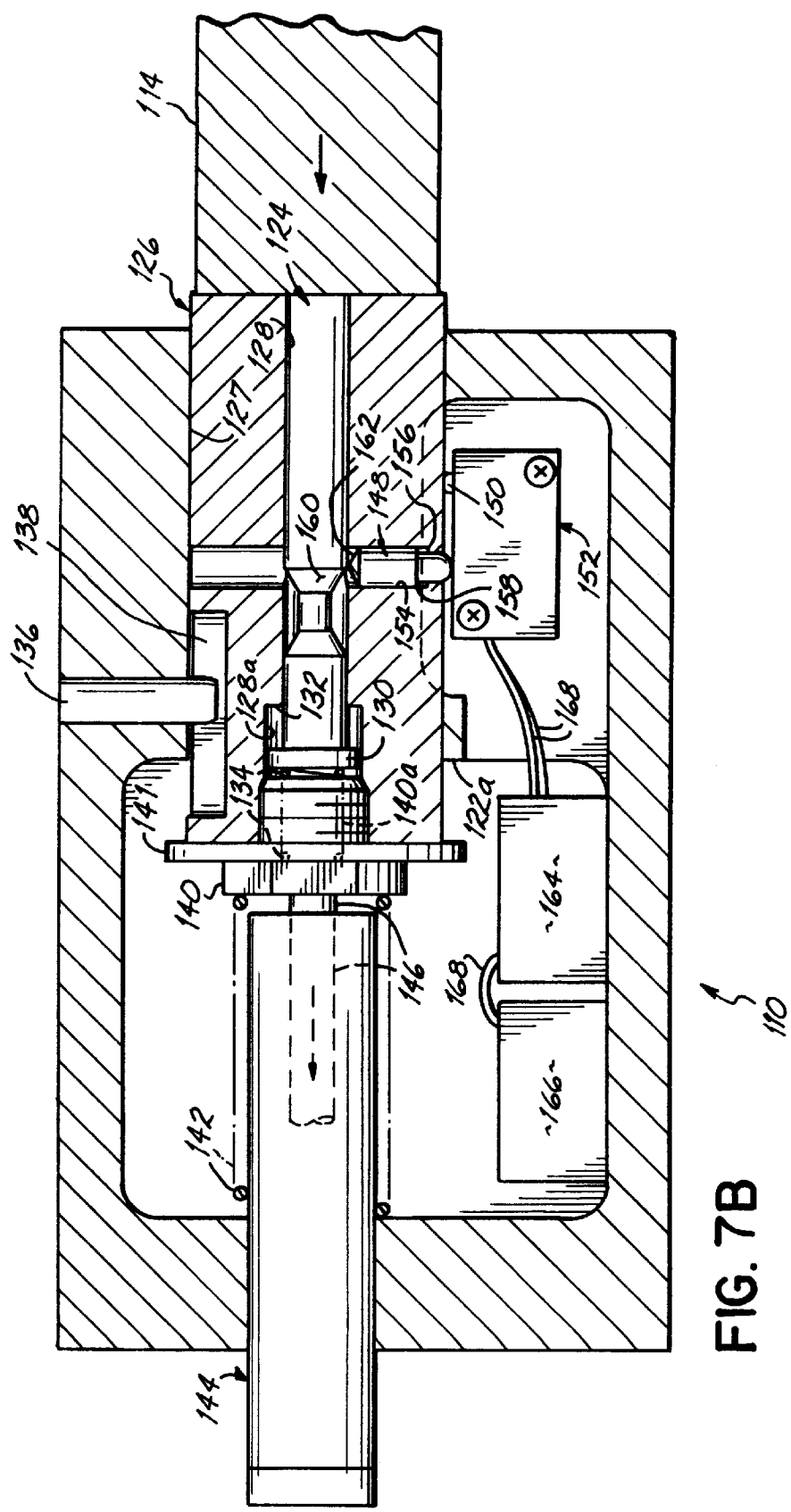
FIG. 7B is a cross sectional view similar to FIG. 7A, but showing the workpiece moving against detection members of the sensing device.
Figure 7C:
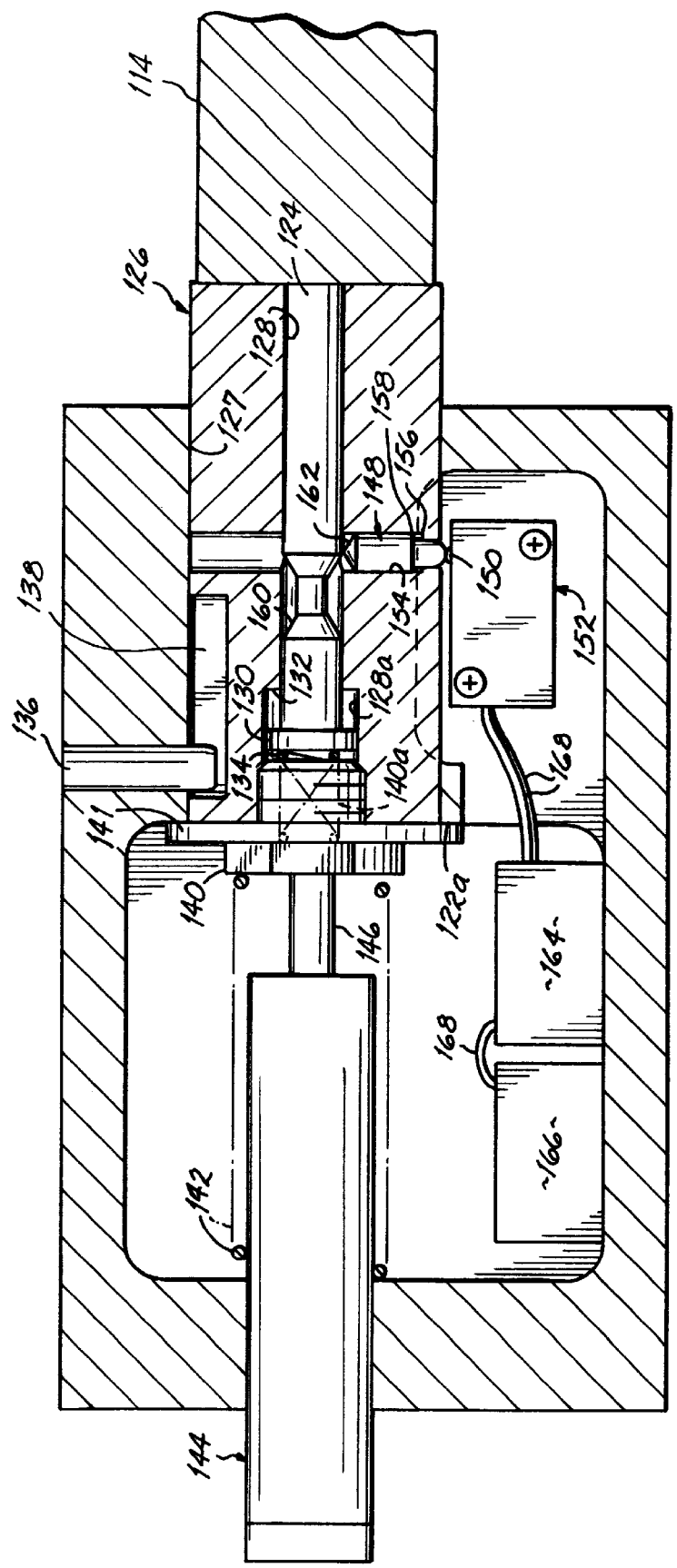
FIG. 7C is a cross section similar to FIGS. 7A and 7B, but showing the workpiece moved back into a proper work position.

As more specifically shown in FIGS. 7A–7C, sensing device 110 includes a support structure 122 with respective first and second detection members 124, 126 mounted for reciprocating movement. Specifically, second detection member 126 is mounted for reciprocation within a passage 127 in support structure 122 and first detection member 124 is mounted for reciprocation within a passage 128 in second detection member 126. First and second detection members may each be cylindrically-shaped members. A flange 130 on the end of first detection member 124 acts as a stop against a step 132 of passage 128. A spring 134 holds first detection member 124 in the normally extended position shown in FIG. 7A. To prevent rotation of second detection member 126 within passage 127, a pin or set screw 136 extends through support structure 122 and into a slot 138 allowing only reciprocal, axial movement of second detection member 126. A screw 140 having a hollow threaded portion 140a receives spring 134 and is threaded into an internally threaded portion 128a of passage 128. Screw 140 also mounts a washer 141 to the end of second detection member. A pressurized fluid cylinder, such as a hydraulic shock absorber 144 includes a piston 146 abutting screw 140 to act as a shock absorber when a workpiece impacts second detection member 126, as will be described. A spring 142 bears against screw 140 to normally maintain washer 141 against an internal wall 122a of support structure 122 as shown in FIG. 7A. This maintains second detection member 126 in the extended position shown in FIGS. 7A and 7C which also represents the proper machining position for workpiece 114.

A movable member 148 is operatively connected between first detection member 124 and a switch element 150 associated with a limit switch 152. Specifically, movable member 148 is mounted for reciprocating movement within a bore 154 contained in second detection member 126. Bore 154 may include a step 156 and movable member 148 may likewise include a stepped portion 158 to ease the assembly process. First detection member 124 includes a cam surface or, in other words, a sloped surface 160. Movable member 148 likewise includes an end having a cam surface or sloped surface 162. As will be appreciated from the description to follow, when first detection member 124 moves to the left upon impact with a workpiece, the interaction between cam surfaces 160, 162 will push movable member 148 into switch element 150. This will send a signal to an RF transmitter 164 mounted within support structure 122. A battery 166, such as a 9V battery, supplies power to RF transmitter 164 and limit switch 152 through appropriate wiring 168. It will be appreciated that motion detection devices of types other than switch 152 may be used, such as proximity sensors, and that combined motion detectors and RF transmitters may be substituted as well.

Figure 8:
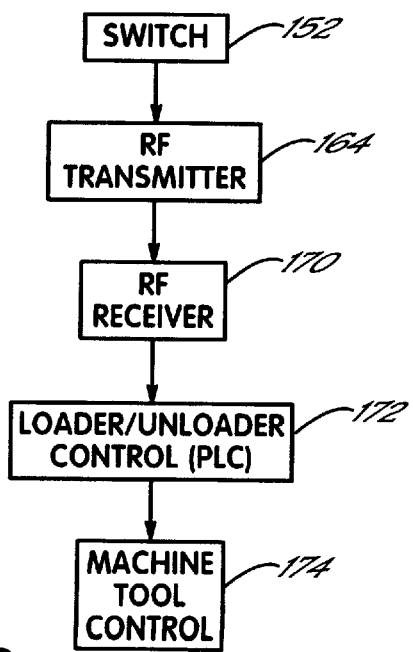
FIG. 8 is a block diagram showing a control system integrated between the workpiece detection device and controls of the loading and unloading device as well as a machine tool.

As further shown in FIG. 7B, upon initial impact by a workpiece 114, first and second detection members 124, 126 will move inwardly against the respective biases of springs 134, 142. As further shown in FIG. 7C, shock absorber piston 146 will slowly move second detection member 126 back to its initial position, however, first detection member 124 will still be in the inward position shown due to the presence of workpiece 114 having a weight that overcomes the bias of spring 134. In this position, therefore, movable member 148 remains extended and engaged with switch element 150 to send a sustained signal to RF transmitter 164. As represented in FIG. 8, this signal is relayed to an RF receiver 170 which then signals either one or both of a loader/unloader control 172, such as a programmable logic controller of device 70, and/or a machine tool control 174 that workpiece 114 is in a proper work position. The control or controls that receive the signal from limit switch 152 may be programmed to ignore any signal but a signal that is sustained, for example, for more than ½ or ¾ of a second. Thus, the initial impact of workpiece 114 with first detection member 124 will cause movable member 148 to instantaneously activate switch element 150, however, this will not be a sustained signal and will be ignored by the control system. Once workpiece 114 is moved by piston 146 and spring 142 back to the position shown in FIG. 7C, a sustained signal will result from limit switch 152 and this signal will be used by the control system to indicate that a machining operation may begin.

While the present invention has been illustrated by a description of a preferred embodiment and while this embodiment has been described in some detail, it is not the intention of the Applicants to restrict or in any way limit the scope of the appended claims to such detail. Additional advantages and modifications other than those specifically mentioned herein will readily appear to those skilled in the art. This has been a description of the present invention, along with the preferred methods of practicing the present invention as currently known. However, the invention itself should only be defined by the appended claims, wherein

I claim:

1. A device for effecting at least one of a loading and unloading operation of a workpiece with respect to a machine tool, the device comprising:

a base adapted to be mounted adjacent said machine tool;

a tubular member mounted on said base having a longitudinal axis and an inner chamber, said tubular member further having an elongate opening communicating with the inner chamber for receiving the workpiece, said inner chamber having one end adapted to communicate with a spindle of said machine tool;

a sealing member mounted for movement relative to said tubular member between a first position at a first distance from said longitudinal axis facilitating sealing engagement around said elongate opening and a second position spaced a second distance from said longitudinal axis, wherein said second distance is substantially larger than said first distance to allow access to said elongate opening and transfer of the workpiece through said elongate opening; and a source of pressurized air communicating with said chamber for moving the workpiece in at least one direction within said chamber when said sealing member is in said first position.

2. The device of claim 1 further comprising:

an actuator connected to said sealing member and operable to move the sealing member between said first position and said second position for allowing the chamber to be loaded with said workpiece.

3. The device of claim 2, wherein said actuator comprises at least one rotary actuator connected to said sealing member for rotating the sealing member toward and away from said tubular member.

4. The device of claim 1, wherein the source of air pressure is a pump connected for communication with said chamber.

5. The device of claim 4, wherein said pump is operable to selectively pressurize said chamber both positively and negatively and thereby selectively move said workpiece toward and away from said one end.

6. The device of claim 1 further comprising selectively engageable and disengageable mechanical fasteners affixing said sealing member to said tubular member.

7. The device of claim 6, wherein said mechanical fasteners include members coupled generally between the base and the sealing member and having portions movable between selective engaged and disengaged positions to effect attachment and removal of the sealing member relative to the tubular member.

8. A method of loading a workpiece into a machine tool spindle, the method comprising:

exposing an elongate opening in a tubular member by spacing a sealing member a first distance away from a longitudinal axis of the tubular member;

inserting the workpiece into the interior of the tubular member through the elongate opening;

sealing the elongate opening by moving the sealing member and thereby engaging the sealing member against said tubular member and around said elongate opening at a second distance from the longitudinal axis which is less than the first distance; and pressurizing the interior of said tubular member to force the workpiece through the tubular member and into the machine tool spindle.

9. The method of claim 8, wherein the step of exposing said elongate opening includes moving the sealing member into a position spaced from the tubular member with an actuator.

10. The method of claim 8 further comprising:

negatively the interior of said tubular member withdraw the workpiece from the machine tool spindle.

11. The method of claim 10 further comprising:

removing the workpiece upon withdrawal from the machine tool spindle by rotating said tubular member and dropping the workpiece out of said elongate opening.

12. A method of unloading a workpiece from a machine tool spindle into the interior of a tubular member, the method comprising:

moving a sealing member from a position spaced away from the tubular member to a position engaged with the tubular member about an elongate opening to thereby seal the elongate opening; and negatively pressurizing the interior of said tubular member to force the workpiece from the machine tool spindle into the interior of said tubular member.

13. The method of claim 12 further comprising:

removing the workpiece from the interior of said tubular member by rotating the tubular member with respect to the sealing member and dropping the workpiece out of said elongate opening.

14. The device of claim 1, wherein said tubular member is mounted for rotation about said longitudinal axis to move said elongate opening from a position allowing workpiece loading into the tubular member to a position allowing workpiece removal from the tubular member.

* * * * *

UNITED STATES PATENT AND TRADEMARK OFFICE
CERTIFICATE OF CORRECTION

PATENT NO. : 6,202,523 B1
DATED : March 20, 2001
INVENTOR(S) : Joseph P. Berns

It is certified that error appears in the above-identified patent and that said Letters Patent is hereby corrected as shown below:

<u>Column 8,</u>
Line 38, after "negatively" insert -- pressurizing --.

Signed and Sealed this

Twenty-seventh Day of December, 2005

JON W. DUDAS
*Director of the United States Patent and Trademark Office*